UNITED STATES PATENT OFFICE.

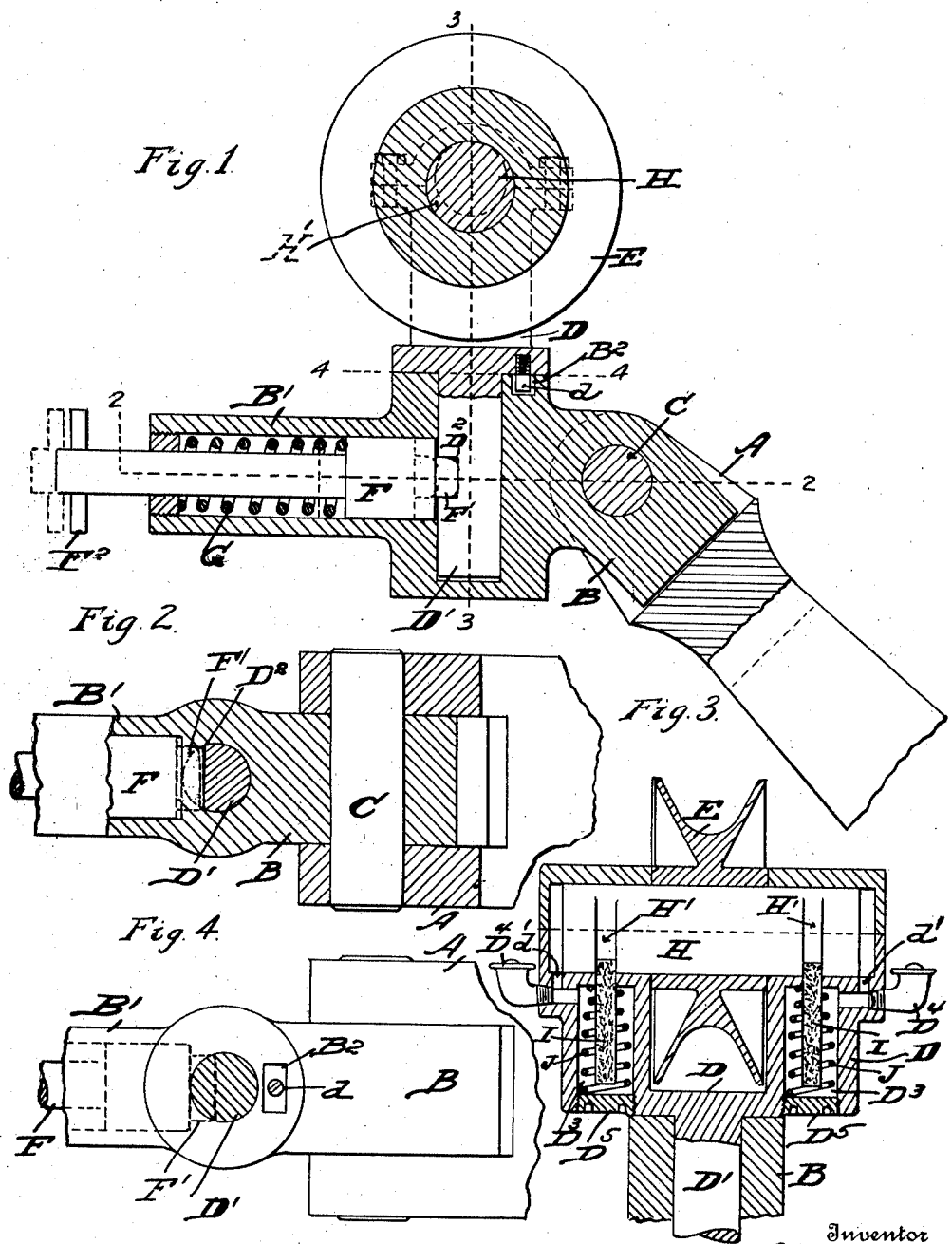

CHARLES P. SKUBLIN, OF DETROIT, MICHIGAN.

TROLLEY-WHEEL.

1,334,564.  Specification of Letters Patent.  Patented Mar. 23, 1920.

Application filed November 6, 1918. Serial No. 261,318.

*To all whom it may concern:*

Be it known that I, CHARLES P. SKUBLIN, a Russian subject, residing at Detroit, county of Wayne, State of Michigan, have invented a certain new and useful Improvement in Trolley-Wheels, and declare the following to be a full, clear, and exact description of the same, such as will enable others skilled in the art to which it pertains to make and use the same, reference being had to the accompanying drawings, which form a part of this specification.

My invention relates to an improvement in trolleys for electric railways shown in the accompanying drawings and more particularly described in the following specification and claims.

One of the objects of this invention is to provide a device which may be readily stored upon the car for installation whenever required.

Another object is to provide a construction in which the wheel is not apt to leave the trolley line upon rounding curves, but which is adapted to flex so as to adapt it to follow any sharp bends or irregularities in the line traversed by the wheel.

Another object of the invention is to provide a device adapted to be installed in the harp carried by the trolley pole in common use, in which a relatively larger trolley wheel may be journaled:—upon the removal of the old trolley wheel from the supporting harp.

Another feature of the invention is the means employed to govern the flexing limit of the trolley wheel when rounding curves.

Another feature is the means employed for lubricating the trolley wheel.

Another feature is the locking means for securing the trolley hanger in the bracket suspended in the usual harp carried by the trolley pole.

With the foregoing and other objects in view, which will appear as the description proceeds, the invention resides in the combination and arrangement of parts and in the details of construction hereinafter described and claimed, it being understood that changes may be made in the precise embodiment of the invention herein disclosed without departing from the spirit of the same.

In the accompanying drawings forming part of this specification:—

Figure 1 is a vertical longitudinal sectional view of the device supported in the usual harp attached to the trolley pole.

Fig. 2 is a horizontal sectional view on line 2—2 of Fig. 1.

Fig. 3 is a vertical sectional view on line 3—3 of Fig. 1.

Fig. 4 is a sectional view on line 4—4 of Fig. 1, showing the locking bolt indicated in Fig. 2 in dotted lines.

Referring now to the letters of reference placed upon the drawings:—

A, denotes the usual harp of a trolley pole in which the trolley wheel is ordinarily journaled.

B, indicates a bracket fixture supported in the harp by a transverse pin C. The bracket is provided with a vertical socket adapted to receive the depending pintle $D^1$ of the removable hanger D, in which the trolley wheel E is journaled.

Extending radially from the hub of the socket portion of the bracket B is a sleeve $B^1$. F, is a bolt actuated by a spring G, having a lug $F^1$ projecting from its end adapted to enter a transverse groove $D^2$ in the depending pintle $D^1$ of the hanger to secure the latter against accidental dislodgment from the supporting bracket. $F^2$ is a cross bar or handle carried by the bolt for manually releasing the bolt from engagement with the pin whereby the hanger may be removed.

To limit the rotation of the hanger in its supporting bracket, that the bolt may not be forced back so as to release the depending pintle $D^1$, a relatively short slot $B^2$ is provided in the wall of the bracket to receive a pin $d$ projecting from the opposing wall of the removable hanger D:—the degree of rotation of the hanger is thus limited by the pin $d$ contacting with the wall surrounding the slot $B^2$, and thus the bolt F is permitted to remain in the transverse slot formed in the depending pintle until manually released.

The axle H, of the trolley wheel E, is provided with eccentric peripheral grooves $H^1$, $H^1$ into which project wicks I, I, formed of hardened felt or other suitable material, in turn yieldingly supported by springs J, J housed in oil wells $D^3$, $D^3$ formed in the wall of the hanger on each side of the trolley wheel. $D^4$, $D^4$ are filler cups through which a lubricant may be delivered to the oil wells. $D^5$, $D^5$ are caps for closing the lower end of the oil wells, by removing which the wicks and their supporting springs may be introduced, or removed for repairs.

It will be noted that rotation of the axle H, serves to agitate the felt wicks due to the action of the eccentric grooves formed in its periphery into which the wicks extend:—thus the wick is caused to dip and the lubricant is carried up to the axle, the surplus oil draining back into the oil wells through the openings $d^1$, $d^1$ in the wall of the bearing.

Attention is directed to the fact that by the use of this invention a relatively larger trolley wheel may be employed than is commonly used, thereby reducing the wear and increasing the life of the wheel through reduction of its speed:—the wheel being adapted to flex upon encountering short turns or other irregularities in the trolley line without danger of leaving the line.

Having thus described my invention, what I claim is:

1. In a device of the character described, a trolley wheel, a removable hanger in which said trolley wheel is journaled having a depending pintle provided with a transverse slot, a supporting bracket having a socket to receive the pintle, a spring actuated bolt housed in said bracket adapted to enter the slot in the pintle to retain the latter in the bracket, and a pin extending from the wall of the hanger into a slot of predetermined length formed in the bracket, whereby the rotation of the pintle in said bracket may be determined.

2. In a device of the character described, a trolley wheel, a removable hanger, an axle for said trolley wheel journaled in said hanger having an eccentric peripheral groove adjacent to each end of the axle, a bracket for supporting said hanger adapted to be mounted upon a trolley pole, having a pair of oil wells formed therein, wicks extending into said oil wells and into the eccentric grooves of the axle, and springs lodged in said oil wells adapted to force the wicks into yielding contact with the axle.

In testimony whereof I sign this specification in the presence of two witnesses.

CHARLES P. SKUBLIN.

Witnesses:
S. E. Thomas,
Edwin R. Monnig.